April 3, 1951 E. F. FLINT 2,547,310
PHOTOELECTRIC, LIQUID-LEVEL INCLINOMETER
Filed Aug. 14, 1947 2 Sheets-Sheet 1

Inventor
EDWARD F. FLINT
By G. A. Ellestad
Attorney

April 3, 1951  E. F. FLINT  2,547,310
PHOTOELECTRIC, LIQUID-LEVEL INCLINOMETER
Filed Aug. 14, 1947  2 Sheets-Sheet 2
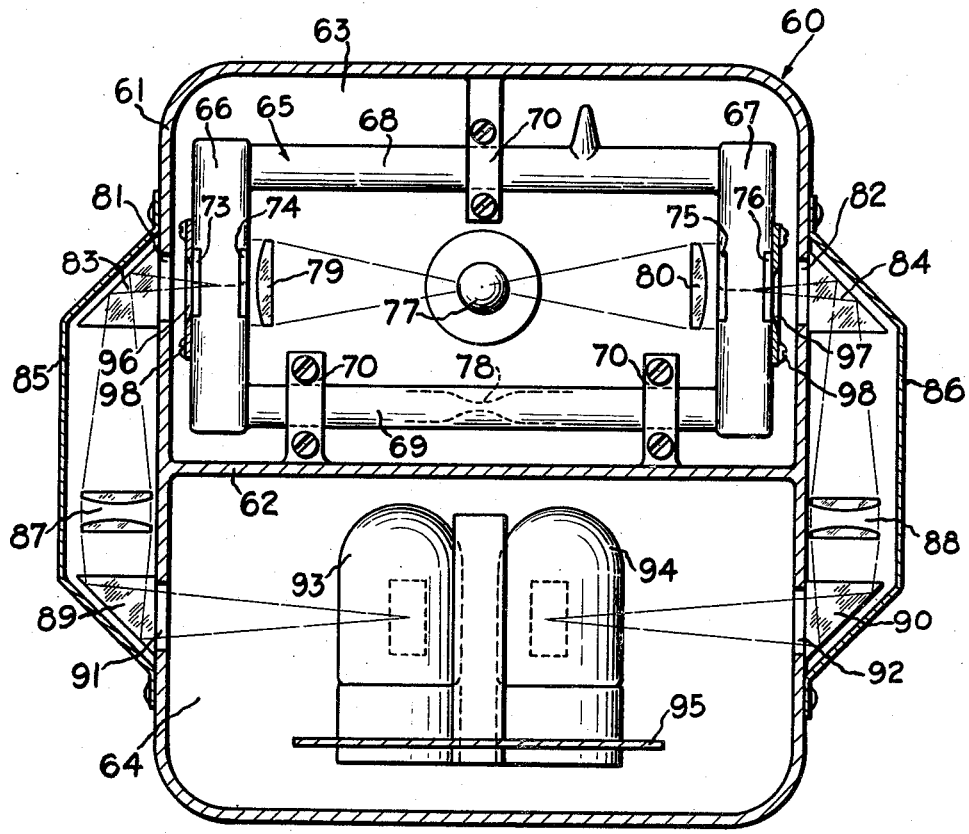
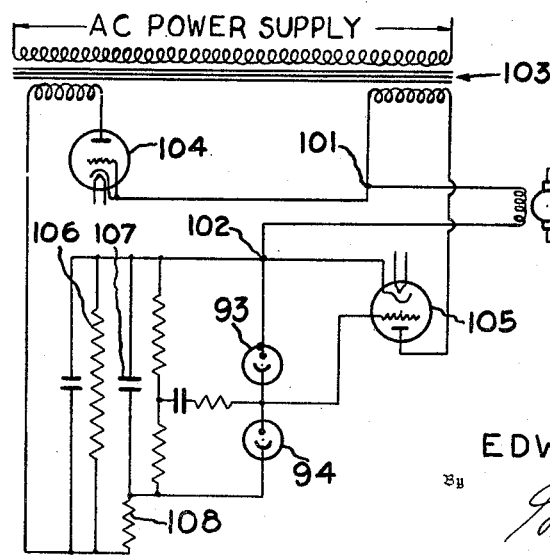
Inventor
EDWARD F. FLINT
By G. A. Ellestad
Attorney Patented Apr. 3, 1951

2,547,310

UNITED STATES PATENT OFFICE 2,547,310

PHOTOELECTRIC, LIQUID-LEVEL INCLINOMETER

Edward F. Flint, Rochester, N. Y., assignor to Bausch & Lomb Optical Company, Rochester, N. Y., a corporation of New York Application August 14, 1947, Serial No. 768,604

2 Claims. (Cl. 33—209)

The present invention relates to inclinometers of the liquid type and more particularly to a relative inclinometer for indicating the angularity of an axis in an aircraft with reference to apparent gravity.

With reference to the use of liquid type inclinometers to show the attitude of an aircraft, it is well known that the liquid which is used as the control medium is subject to displacement caused by forces acting on the liquid as a result of rotation of the aircraft about its axes of rotation. This displacement of liquid results in erroneous indications of the true attitude of the aircraft and consequently causes serious mistakes in coordinating the controls of the aircraft.

In the present invention, it has been determined by extensive experimentation that an instrument of the above type can be so constructed and arranged as to substantially eliminate the undesirable displacement of the liquid while still providing an instrument for aircraft use which has advantages in instrument or "blind" flying. The present invention may also be applied to other devices and equipment wherein it is desired to determine a level or angle of inclination with respect to a horizontal plane.

It is an object of the present invention to provide a novel device of the above type so constructed and arranged that accuracy in performance is assured by controlling displacement of the actuating liquid of the device.

It is another object to provide such a device which is reliable, simple, and economical and embodies a liquid column which is used to control actuation of a device in response to movements of said liquid column.

It is another object to provide such a device in which the actuating element thereof may be located in a position of minimum disturbance within the aircraft and may be combined with other aircraft instruments without impairing the accuracy and sensitiveness of its indicating mechanism.

Still another object is to provide an improved device for controlling the level attitude of instruments and devices such as cameras, bomb sights, and navigating instruments.

Further objects and advantages will be apparent to those skilled in this art by reference to the following description and accompanying drawings in which.

Figure 2:
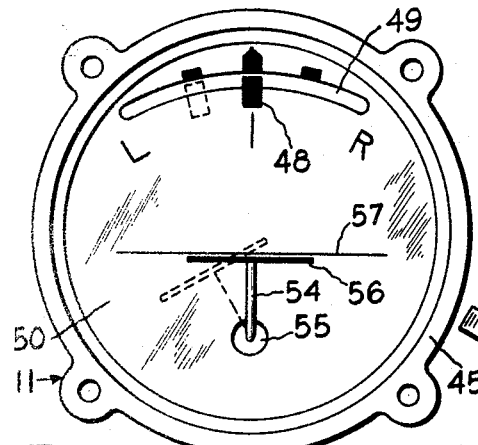
Fig. 2 is a front elevation of the instrument shown in Fig. 1.
Figure 1:
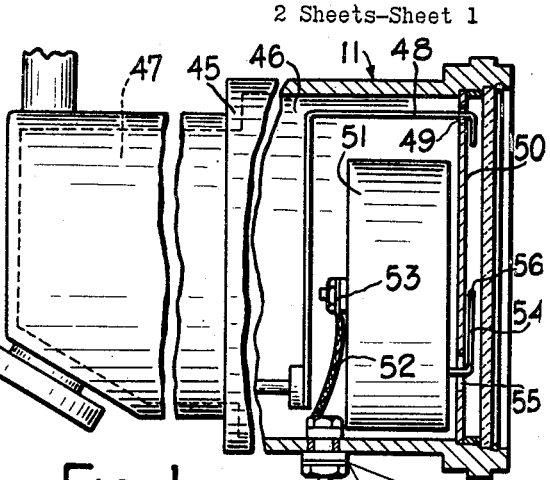
Fig. 1 is a side elevation partly in section and partly diagrammatic of one embodiment of the invention.
Figure 3:
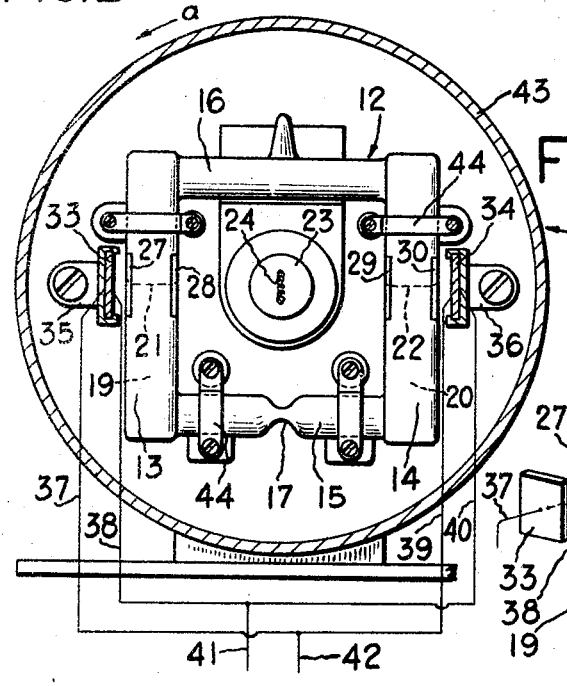
Figure 4:
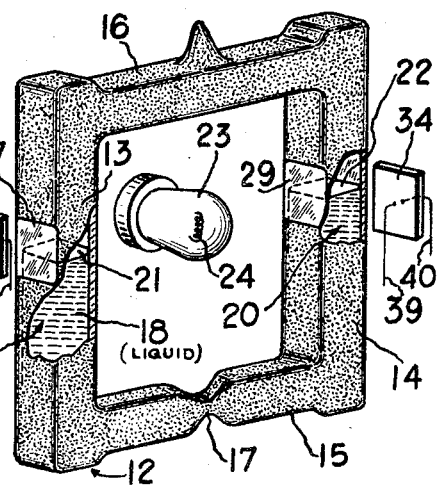
Figure 5:
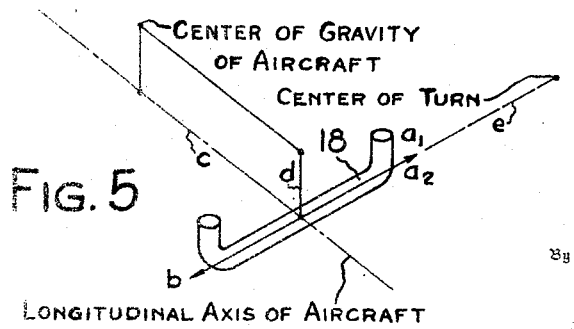

Fig. 3 is a side view on an enlarged scale and partly in section of the actuating member which is shown diagrammatically in Fig. 1, Fig. 4 is a detail in perspective of the operating parts of the actuating member shown in Fig. 3, Fig. 5 is a force diagram relating to the liquid element in the inclinometer, Fig. 6 is a side view of a second embodiment of the invention, with parts in section, and Fig. 7 is an electrical circuit diagram for the device shown in Fig. 6.

The invention, as shown in the embodiment ilustrated in Figs. 1–5, consists of two principal members, namely an actuating member for producing electrical currents in accordance with changes in height of a liquid column and an electro-responsive indicating member actuated by the electric currents, these members being generally illustrated at 10 and 11, respectively. The actuating member 10 may be contructed in a variety of designs, but as shown in Figs. 3 and 4 it comprises a container 12 having a U-shaped part formed by vertical side members 13 and 14 connected at the bottom by a passage 15. The side members 13 and 14 are also connected at the top by a passage 16 so as to form a closed-circuit container. Flow-restricting means preferably in the form of a constriction 17 are located in the lower passage 15. The container 12 may be made if desired of transparent or light-transmitting material such as glass or plastic but such construction is not exclusive. A substantially opaque liquid 18 capable of varying the transmission of light rays directed therethrough is placed in the container 12, the liquid extending partly up the side members 13 and 14 to form liquid columns 19 and 20 terminating in liquid surfaces 21 and 22. A substantially opaque liquid of the organo-silicon oxide class of polymers satisfies the service requirements in this instrument to the best advantage, but other liquids may effectively be used. Since the side members 13 and 14 are connected by the passage 16, the pressures on the tops of the columns 19 and 20 are substantially the same.

Means for directing light rays through the transparent side members 13 and 14 across the tops 21 and 22 of liquid columns 19 and 20 are provided comprising a lamp 23 having the filament 24 thereof substantially in alignment with the surfaces 21 and 22. It will be understood that the lamp 23 is fixedly mounted by suitable means, not shown, and is energized from a battery 24 through a switch 25 and leads 26 and 26'.

In order to restrict the passage of light rays to portions of the side members adjacent the tops of the liquid columns, the entire container 12 is preferably masked or covered by opaque paint or the like excepting at the windows 27 and 28 on opposite sides of member 13 and windows 29 and 30 on opposite sides of member 14. Hence it is not necessary that the entire container be formed of a transparent material as long as it has these clear, transparent windows on both sides of the U-shaped part adjacent the tops of the liquid columns.

It will be seen from the above description that the actuating member 10 in effect constitutes a pair of interconnected liquid shutters for occluding the windows through which the two bundles of light rays pass in opposite directions from the light source.

Mounted respectively adjacent to the sides 13 and 14 and substantially equidistant from lamp 23 are the light-responsive elements such as photo-voltaic cells 33 and 34 which are positioned so as to intercept light rays which emanate from the light source 23 and pass through the transparent windows and over the tops of the liquid columns 19 and 20. Supporting brackets 35 and 36 support the cells 33 and 34 opposite the windows 27—30 and the leads 37, 38 and 39, 40 of Fig. 4 are fixed to the photocells 33 and 34 respectively to carry the electrical currents therefrom into the outside leads 41 and 42. The component parts of the actuating member 10 are enclosed in a casing 43, and are properly supported and aligned therein by suitable devices such as the clips 44.

From the foregoing, it will be apparent that the actuating member 10 operates in the following manner. Inclination of the container 12 in the plane of the two columns 19 and 20 and in the direction of the arrow a in Fig. 3 causes the liquid column 20 to fall and the column 19 to rise with respect to the photocells. The accompanying flow of liquid 18 from one column to the other is retarded by the constriction 17 in the lower passage to introduce a time delay in the liquid action so that sudden short-duration movements will not cause an erroneous indication on the indicating member 11. As the opaque liquid in column 20 falls over the windows 29 and 30, the light rays from the lamp 23 which strike photocell 34 are progressively increased while conversely, the light rays received by the photo-electric cell 33 are correspondingly decreased. The cells 33 and 34 generate a voltage response in opposition to each other, the stronger voltage predominating to cause a flow of electricity which is conducted by the leads 41 and 42 to the milliameter 51 to deflect the bar 56. When the actuating member 10 is in a level or normal condition, it will be apparent that both liquid columns have substantially the same height so that the light responses of both cells are substantially equal and opposite whenever the instrument is in a null position.

The indicating member 11 may be constructed in the form of an individual unit or may be combined with other aviation instruments such as a turn indicator. In Fig. 1, the combined form is shown in which the indicating member 11 is included in a casing 45 having two principal chambers 46 and 47 at the front and rear, respectively. The rear chamber 47 houses an air-jet operated gyroscopic turn indicating mechanism of familiar design such as illustrated in the United States patent to C. J. Crane, No. 2,280,797, dated April 28, 1942. The indicating hand 48 of the mechanism extends forwardly through the arcuate opening 49 in the instrument dial 50. In the front chamber 46, an electro-responsive device such as a milliammeter 51 is secured by any desired means, not shown, and leads 52 taken from the binding posts 53 connect with the leads 41 and 42 to actuate the milliammeter 51 by currents from the photo-voltaic cells 33 and 34. A hand 54 projecting from the front of the milliammeter 51 through the hole 55 in the dial 50 is pivoted to swing across the dial and has a cross bar 56 mounted thereon. The dial 50 carries a horizontal fiducial line 57 which is substantially parallel to the lateral axis of the aircraft so that when the aircraft is properly banked or inclined the indicating bar 56 will be aligned parallel with the fiducial line 57.

It will be noted that the indicating member 11 does not show the inclined position of the aircraft with respect to the horizon when turning an aircraft in flight but does show errors in coordination between the rudder control and the aileron control. In turning, two principal forces act on the liquid 18, namely, a gravity force directed vertically toward the earth and a centrifugal force directed outwardly from the turn parallel to the radius of turn. The resultant force obtained by composing these two forces has a direction parallel to the vertical axis of the aircraft when the aircraft is properly banked in turning so that line 57 and cross bar 56 on the instrument face 50 are then coincident. In this description the "resultant force" is otherwise known as "apparent gravity." If, for instance, the aircraft is skidded around a right turn with the right wing too high for a properly coordinated turn, the right end of the cross bar 56 will be deflected upwardly above the fiducial line 57 as shown by dotted lines in Fig. 2. The pilot is thereby notified to depress the right wing so as to regain a properly coordinated turn. Since the cross bar 56 is functionally arranged to represent the lateral axis of the aircraft, the corrective motion suggested by the position of the bar 56 relative to the fiducial line 57 is congruent with the motion required to correct the banking position of the aircraft.

One of the important features of this invention is the placement of the actuating member 10 in an aircraft. Experimental flight testing has revealed that the actuating member 10 should be located in the proximity of the center of gravity of the aircraft so that the liquid 18 in the actuating member is near the center of rotation of the aircraft and responds in the desired manner to abnormal flight conditions. Since the modern trend toward great size of aircraft results in locating the aircraft instrument room a great distance from the center of gravity of the craft, the actuating and indicating members of this invention are separated and only the device which is actuated by the actuating member such as the indicator member 11, is located in the instrument room of the aircraft.

Locating the actuating member near the center of gravity of the aircraft, is particularly advantageous for example when this invention is used for "blind" flying. The usual procedure for "blind" flying is to turn the aircraft alternately right and left through gentle turns of short duration so as to keep the right side of the guide beam located by the audibility of the proper guiding signals. Turns with minimum bank are employed to keep the antennae of the radio signal receiver in a favorable position for good reception of the radio tower radiations. When the actuating member is placed somewhat to the rear and below the center of gravity of the aircraft, the forces acting on the fluid 18 are adequately compensated to produce substantially no displacement thereof during short-duration turns with minimum bank. Referring to Fig. 5, the forces involved are there diagrammed. The force due to inertia of the liquid at $a_1$ having a radius arm $c$ caused by the yawing of the aircraft about its center of gravity to the right is opposed by the centrifugal force $b$ at the radius arm $e$ of the turn. The rolling movement of the aircraft about its fore and aft axis creates an inertia force at $a_2$ with lever arm $d$ which together with inertia force $a_1$ opposes and substantially counteracts the centrifugal force $b$ for all short-duration turning movements. Continuation of the turn with minimum bank causes the force $b$ to become much greater than the sum of $a_1$ and $a_2$, which eventually causes deflection of the bar 56 thus notifying the pilot that the turn must be coordinated by a motion of the aileron or rudder. By thus advantageously locating the indicating member 11 in the aircraft, the necessary short-duration turns with minimum bank can be accomplished without an appreciable response in the indicating member, whereas a sustained abnormal attitude of the aircraft is truly recorded by the indicating member.

When used as a level indicator with respect to the horizon, accelerations at $a_1$, $a_2$, and $b$ are reduced by flying the aircraft in approximately a straight line, so that the indicator will only be affected by the acceleration of gravity.

Fig. 6 of the drawings illustrates a second form of the invention which is particularly adapted to detect very small angles of inclination of the actuating member. This device may be generally used to control with precision the level attitude of an apparatus connected thereto such as for instance navigation instruments, bomb sights, and aerial cameras.

In this form of the invention the actuating member generally illustrated at 60 is unified and enclosed by a light-tight casing 61 having a rigid septum 62 therein forming an upper chamber 63 and a lower chamber 64. To increase the operational precision of the actuating member, a greatly elongated liquid container 65 is provided by virtue of which slight angular movements in the general plane of the container result in increased movement of the liquid. Similarly to the first form of this invention, the liquid container 65 having side members 66 and 67 connected together by upper and lower passages 68 and 69, respectively, is securely held in the upper chamber 63 by brackets 70. These brackets may incorporate spring means, if desired, to permit relative expansion between the liquid container and the casing. Mutually aligned transparent portions or windows 73 and 74 in side member 66 and corresponding windows 75 and 76 in side member 67 are provided and a lamp 77 is mounted in alignment with the windows, midway between the side members so that light rays may be projected therethrough. An opaque liquid in the container 65 extends partially up into each side member 66 and 67 to form liquid columns terminating opposite the windows, the form of the liquid columns and the composition of the liquid being the same as described in the first embodiment of the invention. A constriction 78 for limiting the flow of liquid through the lower passage 69 is formed therein. In effect, the liquid columns together with the transparent windows constitute a pair of liquid shutters for occluding light rays passing through the windows.

Light rays emanating from the lamp 77 are directed by the condenser lenses 79 and 80 through the windows and a pair of openings 81 and 82 in the casing 61 to an upper set of 90° prisms 83 and 84 located in optical alignment with both the lamp and windows on opposite sides of the casing 61. Enclosing and supporting the prisms 83 and 84 are the light-tight housing members 85 and 86 which are secured to the casing 61. Within the housings 85 and 86, projection lenses 87 and 88 and a lower set of 90° prisms 89 and 90 are rigidly mounted in optical alignment with the prisms 83 and 84, respectively. Adjacent the lower prisms 89 and 90, openings 91 and 92 are formed in the casing through which light rays from the lamp 77 are projected into the lower chamber 64 from the two opposite optical systems described above.

Photo-electric means of any desired form such as the phototubes 93 and 94 are mounted on the rigid shelf 95 within the chamber 64 in a position to receive the light rays entering the chamber through the openings 91 and 92.

In order to alter the occluding action of the liquid shutters, adjustable diaphragms in the form of apertured plates 96 and 97 are mounted adjacent the windows 73 and 76, respectively. The diaphragms are secured in a fixed position on suitable brackets, not shown, by any preferred means such as the screws 98 which preferably extend through elongated openings, not shown, in the diaphragms, the elongated openings permitting relative vertical movement between the diaphragms and their supporting brackets.

An electro-responsive device such as a reversing motor 100, governed by the current output of the phototubes 93 and 94, is shown diagrammatically in Fig. 7 embodied in a well-known recorder circuit in which reversals of current flow at the junctions 101 and 102 are governed by the photo-electric response of the series-connected phototubes 93 and 94.

Power for the field circuit of the servomotor 100 is supplied by the secondary windings of a transformer 103 to energize the rectifier tube 104 and the amplifier or control tube 105, both tubes being connected at the junction points 101 and 102 to feed the field circuit of the motor 100. The rectifier tube 104 passes a half-wave direct current through the field circuit of motor 100 in the direction necessary to turn the motor in one direction of rotation. The control tube 105 passes a similar current in the field circuit of the opposite polarity which causes the motor 100 to turn in the opposite direction. In addition to supplying the current necessary to excite the servomotor field, the rectifier tube also provides a source of voltage to operate the phototubes 93 and 94. This voltage, as obtained across the series resistance 106, is, of course, half-wave direct current. The resulting pulsating potential drop is filtered before application to the phototubes by means of the capacitance 107 and series resistance 108 which is connected across the resistor 106.

The circuit is balanced so that an equal amount of light striking the two phototubes will cause no current to flow through the servomotor field. When there is more light on phototube 94 than the phototube 93, the grid voltage of control tube 105 swings negative. This decreases the current through the control tube 105, allowing the rectifier current to become predominant in the motor field, and the motor will start turning in a direction congruent with the polarity of the current. The predominant current flow in the field circuit of the motor is, therefore, dependent on the instantaneous relative strength of the opposed rectifier and amplifier circuits. Since the armature of the motor 100 is connected directly to a D. C. source, a reversal in polarity of D. C. current flow through the field of the motor results in a reversal of the rotation of the motor.

Because of the wide range of sensitivity which is available on the above-described circuit to a change in photoelectric response of the phototubes 93 and 94 and because of the variation of the occluding action of the liquid columns by changing the setting of the diaphragms 96 and 97, the practical scope of use of this device in an aircraft is greatly extended. Attention is called to the fact that the motor 100 has the same relationship to the actuating member 60 as the indicating member 11 has to the actuating member 10 of the first embodiment of this invention. The servomotor 100 is arranged so that it will actuate suitable mechanism whereby the level attitude of a device such as an instrument may be maintained automatically. Thus, for example, two of the actuating members, such as shown in Figs. 4 and 6, may be mounted at right angles to each other on a platform so that the latter may be automatically maintained in a level position. Instead of employing two separate actuating members, the container 12 may, for example, be provided with another pair of upright members arranged at right angles to the plane of members 13 and 14 and all inter-connected so that the liquid will extend up into all four side members. Another pair of light-responsive cells would, of course, need to be operatively positioned with respect to the other pair of side members.

From the foregoing, it will be apparent that I am able to attain the objects of my invention and provide a liquid type inclinometer which will be simple in structure yet efficient in operation. My device provides an improved means for indicating the flight attitude of aircraft and also affords an improvement in apparatus for indicating angles of inclination. It can also be embodied to good advantage in an apparatus for automatically maintaining the level attitude of navigation instruments, cameras or the like. Various modifications may obviously be made without departing from the spirit of the invention as pointed out in the appended claims.

I claim:

1. A device of the type described comprising a light-tight casing having upper and lower chambers and communicating openings therebetween, a liquid container positioned in one chamber, said container having a U-shaped portion, a substantially opaque liquid in the container and forming columns extending partially up the sides of the U-shaped portion, said sides having transparent windows adjacent the tops of the columns and in alignment with said openings, a light source positioned midway between the sides of the container to direct light rays across the tops of the columns, a pair of light responsive cells located in the other chamber, and optical means for directing through said openings and onto the respective cells light rays which pass across the tops of the columns, and electrical means for converting the light responses of said cells into mechanical motion as the casing is tilted in the vertical plane of the container to cause the respective columns to rise and fall and thereby decrease the light rays falling on one cell and increase the rays striking the other cell.

2. In an inclinometer, the combination of a casing having upper and lower chambers and communicating passageways connecting the adjacent sides of the respective chambers, a liquid container in one chamber, said container having a U-shaped portion, a substantially opaque liquid within the container forming columns extending partially up the sides of the U-shaped portion, said sides having transparent windows adjacent the tops of the columns and in alignment with said passageways, a light source positioned between the sides of the container to direct light rays across the tops of the columns, a pair of light responsive cells in the other chamber and in alignment with the passageways, and reflectors and lenses in the passageways for directing onto the respective cells light rays which pass across the tops of the respective columns whereby tilting of the container in a vertical plane will produce different responses in the respective cells.

EDWARD F. FLINT.

REFERENCES CITED

The following references are of record in the file of this patent:

UNITED STATES PATENTS

| Number | Name | Date |
|---|---|---|
| 1,068,110 | Converse | July 22, 1913 |
| 1,305,935 | Rieker | June 3, 1915 |
| 1,626,567 | Steinbrecht | Apr. 26, 1927 |
| 1,885,098 | Hill | Oct. 25, 1932 |
| 1,930,496 | Wilson et al. | Oct. 17, 1933 |
| 1,955,315 | Styer | Apr. 17, 1934 |
| 2,019,871 | Pettingill et al. | Nov. 5, 1935 |
| 2,075,502 | Carlson | Mar. 30, 1937 |
| 2,252,727 | Pepper | Apr. 19, 1941 |
| 2,268,256 | Knouse | Dec. 30, 1941 |
| 2,371,388 | Glenny | Mar. 13, 1945 |
| 2,410,550 | Padva | Nov. 5, 1946 |
| 2,427,902 | Clifton et al. | Sept. 23, 1947 |

FOREIGN PATENTS

| Number | Country | Date |
|---|---|---|
| 411,775 | Great Britain | 1934 |